United States Patent Office 2,760,951
Patented Aug. 28, 1956

2,760,951

RESINOUS NITROMETHANE REACTION PRODUCTS

Harold F. Park, East Longmeadow, and Robert J. Anderson, Springfield, Mass., assignors to Monsanto Chemical Company, St. Louis, Mo., a corporation of Delaware No Drawing. Application May 16, 1952,
Serial No. 288,316

4 Claims. (Cl. 260—57)

This invention relates to thermosetting heat reaction products. More particularly, this invention relates to thermosetting heat reaction products having a high bond strength that may be prepared by a process that can be easily and accurately controlled.

Thermosetting resins prepared by co-condensing formaldehyde with aldehyde-reactable compounds have many desirable properties and are widely used at the present time as molding compositions, binding agents, surface-coatings, etc. One of the chief advantages of thermosetting resins of this character stems from the fact that they can be produced in quantity at low cost using a relatively rapid production cycle and the reaction process can be accurately controlled by using suitable precautions. However, conventional thermosetting resins of this nature are characterized by a relatively low bond strength and, as a result, they do not possess a strong natural affinity for other non-resinous substances. This is largely attributable to the fact that the reaction products of formaldehyde with the conventional aldehyde-reactable compounds are substantially non-polar in nature.

Generally speaking, it has not been possible to prepare thermosetting resins from polar compounds because when such a compound is reacted with formaldehyde, the resultant reaction product is generally a non-resinous crystalline compound rather than a high molecular weight polymeric resin of a thermosetting nature.

In the past, formaldehyde has been reacted with polar compounds, such as some of the nitroparaffins and reaction products of a resinous nature have been prepared. However, the resinous products have generally not been of a thermosetting character and, as a result, have not been useful as molding compositions, binders, surface-coatings, etc.

Accordingly, an object of the present invention is the provision of thermosetting resinous reaction products.

Another object is the provision of thermosetting heat reaction products having a high bond strength.

Another object is the provision of a novel process for preparing such compounds that may be easily and accurately controlled.

These and other objects are attained by reacting together a mixture of nitromethtane, phenol and formaldehyde in the presence of a condensation catalyst and at temperatures above 60° C. in order to form co-condensation resinous reaction products of a thermosetting nature.

The thermosetting resins of the present invention may be prepared using either an acidic or a basic condensation catalyst. The following examples are illustrative of a preferred method of preparing resinous nitromethane reaction products using such catalysts, and are given by way of illustration rather than as limitations to the scope of our invention. Where parts are mentioned, they are parts by weight.

The preparation of a co-condensation product of nitromethane, phenol and formaldehyde using a basic condensation catalyst is illustrated by the following example.

Example I

A reaction mixture was prepared by placing 57.6 parts nitromethane (0.9 mol), 10 parts phenol (0.1 mol) and 110 parts formalin (1.4 mols of formaldehyde) in a jacketed reaction kettle at room temperature. The ingredients were agitated until a uniform mixture was obtained and then 5 parts of an aqueous ammonium hydroxide solution containing approximately 28% ammonia were slowly added with agitation, the agitation being continued for an additional 30 minutes. At room temperature substantially no reaction takes place. In order to obtain a satisfactory co-condensation reaction, 2 parts sodium hydroxide flakes were slowly added to the mixture over a 60 minute interval, the temperature being concurrently raised to 100° C. by gentle heating. The reaction was carried out at atmospheric pressure and was substantially complete after an additional 5 minutes of agitation at a temperature of 100° C. and atmospheric pressure. The solution was dehydrated under vacuum with heat and a dark brown resin was recovered. The resin was insoluble in water and soluble to a limited extent in acetone. It could be cured to an insoluble, infusible condition upon further heating.

Uncured resins of this character may be bonded directly to glass and are also useful as binding agents for textiles, paper, etc. The uncured resins are also suitable for fabrication into surface-coatings, moldings, laminates, etc.

An acid catalyst may also be employed in the preparation of the co-condensation products of our invention, but a somewhat different procedure must be followed, as illustrated by the following example.

Example II

Thirty-two parts nitromethane (0.5 mol), 50 parts phenol (0.5 mol) and 0.6 part concentrated sulfuric acid (1.84 specific gravity) were placed in a jacketed reaction kettle under substantially anhydrous conditions, the only water being that present in the concentrated sulfuric acid. The mixture was agitated until uniform and then heated to a temperature of 95° C. and, while maintained at this temperature, 110 parts formalin (1.4 mols of formaldehyde) were then slowly added over a period of about 1 hour with agitation. The agitation and heating were continued at atmospheric pressure at a temperature of 95° C. for an additional 2 hours, at the end of which time the reaction had gone to substantial completion. The solution was dehydrated under vacuum with heat and a dark brown resin was recovered which was insoluble in water and soluble to a limited extent in acetone. It could be cured to an insoluble, infusible condition upon further heating.

Uncured resins prepared in accordance with the procedure of Example II may also be bonded directly to glass, and are likewise useful as binding agents in the preparation of textiles, paper, etc. The uncured resins may be fabricated into surface-coatings, moldings, laminates, etc.

When an acid catalyst is used, it is necessary that the phenol, nitromethane and catalyst be mixed and heated to reaction temperature under substantially anhydrous conditions prior to the addition of the formaldehyde. If water is present in any substantial amount during the initial mixing and heating operation, the presence of the acid catalyst will tend to cause the nitromethane to decompose. Paraformaldehyde may be used in place of the formalin of Example II with equally satisfactory results.

If desired, heat reaction productes of the Novolak type may be prepared in accordance with the procedure of Example II by neutralizing the acid catalyst after the reaction has gone to completion, less than about 2 mols of formaldehyde per mol of nitromethane-phenol mixture being used. A method of preparing a resin of this character is illustrated by the following example.

*Example III*

A reaction mixture was prepared as in the case of Example II by adding 32 parts nitromethane (0.5 mol), 50 parts phenol (0.5 mol) and 0.6 part concentrated sulfuric acid (specific gravity of 1.84) to a jacketed reaction kettle under substantially anhydrous conditions and with agitation. The mixture was heated to a temperature of 95° C. and 65 parts formalin (0.9 mol of formaldehyde) were slowly added over a period of about 1 hour with agitation, the agitation being continued at atmospheric pressure and a temperature of 95° C. for an additional two hours. At the end of this time the reaction was substantially complete, and the reaction product was neutralized with a slurry of calcium hydroxide and water. The solution was dehydrated under vacuum with heat and a resinous reaction product was obtained which was slightly soluble in water and soluble in acetone. Resins of this character are also curable to an insoluble, infusible condition when heated in the presence of a curing agent such as formaldehyde or hexamethylenetetramine and are useful in the preparation of lacquers, varnishes, etc. Paraformaldehyde may be used in place of the formalin with equally satisfactory results.

The resins produced by the methods illustrated in the above examples may be recovered by other conventional methods such as oven drying, etc.

Generally speaking, a thermosetting co-condensation product will not be obtained if the reaction temperature is less than about 20° C., regardless of the type of catalyst used, and in order to obtain a satisfactory reaction, it is necessary that a temperature of at least about 60° C. be used. It is preferable to carry out the reaction at reflux temperature and atmospheric pressure in order to obtain a better yield. The temperatures of the preceding examples were approximately the reflux temperatures of the solutions employed.

The condensation products of our invention may be cured by heat alone or together with a curing catalyst such as hexamethylenetetramine, etc.

For the purpose of computing the amount of formaldehyde and catalyst to be used, nitromethane and phenol may be considered together as a unit. Each mol of nitromethane-phenol mixture should contain from 10 to 95 mol percent of phenol and correspondingly from 90 to 5 mol percent of nitromethane. Satisfactory molding compositions are not obtained in the absence of phenol and at least 10 mol percent of phenol should be used. If less than about 5 mol percent of nitromethane is used, the resulting reaction product will not possess the high bond strength characteristic of the resins of the present invention.

The amount of formaldehyde that may be reacted with the nitromethane-phenol mixture may be varied from about 0.5 to 3 mols of formaldehyde per mol of mixture with satisfactory results, or, if desired, an excess of formaldehyde may be used, and the excess removed after the reaction has gone to completion. Generally speaking it is preferable to react from 1 to 3 mols of formaldehyde with each mol of nitromethane-phenol mixture when a heat-hardenable reaction product is to be prepared, and to react from 0.5 to 2 mols of formaldehyde per mol of mixture when a Novolak type resin is desired.

The ammonium and sodium hydroxide catalysts of Example I are illustrative of a wide variety of basic catalysts that may be used, as for example: alkali and alkaline earth metal hydroxides including sodium hydroxide, potassium hydroxide, calcium hydroxide, barium hydroxide etc., aliphatic amines including monoethylamine, diethylamine, triethylamine, etc., and other alkaline catalysts such as ammonium hydroxide, tetraethyl ammonium hydroxide, etc.

The concentrated sulfuric acid catalyst of Examples II and III may likewise be replaced by other acid catalysts such as phosphoric acid, oxalic acid, toluene sulfonic acid, formic acid, etc. However, as indicated, the acid catalyst must be added to the nitromethane-phenol mixture under substantially anhydrous conditions.

By following the procedure illustrated in Examples I–III nitromethane may be readily reacted with formaldehyde and phenol in order to produce resinous reaction products, and under the suitable conditions outlined, the reaction may be easily and accurately controlled.

The resins of our invention may be compounded with other conventional ingredients in order to prepare products having a wide variety of properties. For example, there may be added fillers, pigments, dyes, natural or synthetic resins such as rosin, kauri, alkyd resins, vinyl resins, cellulose derivatives, urea resins, urea-thiourea resins, melamine and other triazine resins, drying oils such as linseed oil, tung oil, etc.

From the foregoing, it will be apparent that nitromethane may be used in the preparation of a wide variety of resinous reaction products having valuable physical properties. It is understood that the above description is given by way of illustration only and not in limitation and that deviations are possible within the spirit of the invention.

What is claimed is:

1. A process for preparing a moldable resinous heat-reaction product which comprises reacting from 0.5 to 3 mols of formaldehyde with 1 mol of a mixture of 90–5 mol percent nitromethane and 10–95 mol percent phenol in the presence of a condensation catalyst at a temperature of at least 60° C.

2. A process as in claim 1 wherein the condensation catalyst is a basic catalyst and wherein from 1 to 3 mols of formaldehyde is used for each mol of mixture.

3. A process as in claim 1 wherein the condensation catalyst is an acid catalyst, wherein from 0.5 to 2 mols of formaldehyde is used for each mol of mixture and wherein the nitromethane, phenol and acid catalyst are heated to reaction temperature under substantially anhydrous conditions prior to the addition of the formaldehyde.

4. A process as in claim 3 wherein the reaction product is neutralized after the reaction has gone to substantial completion.

References Cited in the file of this patent

UNITED STATES PATENTS

| | | |
|---|---|---|
| 2,053,850 | Sturken | Sept. 8, 1936 |
| 2,531,863 | Scott | Nov. 28, 1950 |